(12) United States Patent
LeMay et al.

(10) Patent No.: US 7,759,908 B2
(45) Date of Patent: Jul. 20, 2010

(54) ELECTRONIC DEVICE IDENTIFICATION SYSTEM

(75) Inventors: Charles LeMay, Portsmouth, NH (US); Clifford Risher-Kelly, Wells, ME (US)

(73) Assignee: Draeger Medical Systems, Inc., Andover, MA (US)

( * ) Notice: Subject to any disclaimer, the term of this patent is extended or adjusted under 35 U.S.C. 154(b) by 243 days.

(21) Appl. No.: 11/964,463

(22) Filed: Dec. 26, 2007

(65) Prior Publication Data

US 2008/0157714 A1 Jul. 3, 2008

Related U.S. Application Data

(60) Provisional application No. 60/882,258, filed on Dec. 28, 2006.

(51) Int. Cl.
*H02J 7/00* (2006.01)
(52) U.S. Cl. .................. 320/166; 320/167; 320/106; 320/135; 320/127
(58) Field of Classification Search ................. 320/106
See application file for complete search history.

(56) References Cited

U.S. PATENT DOCUMENTS

| | | | |
|---|---|---|---|
| 5,004,970 A | 4/1991 | Barou | |
| 5,623,550 A * | 4/1997 | Killion | 381/322 |
| 5,986,441 A | 11/1999 | Koroncai et al. | |
| 6,183,417 B1 | 2/2001 | Geheb et al. | |
| 6,424,125 B1 * | 7/2002 | Graham | 320/166 |
| 6,456,156 B1 | 9/2002 | Frey et al. | |
| 6,819,013 B2 | 11/2004 | Kelly et al. | |
| 7,221,208 B2 | 5/2007 | Kubota et al. | |
| 7,274,168 B2 * | 9/2007 | Tskukamoto et al. | 320/106 |
| 7,382,270 B2 * | 6/2008 | Wendelrup et al. | 340/636.1 |

FOREIGN PATENT DOCUMENTS

| | | |
|---|---|---|
| EP | 1501333 | 1/2005 |
| EP | 1571878 | 9/2005 |

OTHER PUBLICATIONS

International Search Report dated Jun. 26, 2008, Application Nos. EP1571878, EP1501333.

* cited by examiner

*Primary Examiner*—Edward Tso
*Assistant Examiner*—Ahmed Omar
(74) *Attorney, Agent, or Firm*—Jack Schwartz & Associates, PLLC.

(57) ABSTRACT

An electronic device identification system includes a rectifier bridge for providing an output DC voltage of fixed polarity from an input DC voltage of a corresponding or reverse polarity. The system further includes an identification component coupled across an input to the rectifier bridge. This enables identification of the identification component value via electrical detection circuitry applied to the input to the rectifier bridge.

25 Claims, 4 Drawing Sheets

ELECTRONIC DEVICE IDENTIFICATION SYSTEM

This is a Non-Provisional application of U.S. Provisional Application Ser. No. 60/882,258 Filed Dec. 28, 2006.

FIELD OF THE INVENTION

The present invention relates generally to the field of power supplies for electronic devices, and more particularly to the interconnection of power supplies by means of removable sockets or docking apparatus.

BACKGROUND OF THE INVENTION

Many portable electronic devices utilize a portable, self contained, power source such as a battery to provide the necessary operating current and voltage when the device is not connected to a more permanent power source such as an electrical outlet. Frequently the battery is a rechargeable type that may be characterized, for example, as a nickel cadmium, lithium ion or lead acid type. Many different methods have been utilized to recharge such batteries while the battery resides within the parent portable device. In generic environments, a pair of copper wires is used to charge the battery. The leads of the charging wire are usually covered with an insulating layer and therefore unexposed. The leads make contact with the battery within the device when the leads are secured to a suitable terminal strip or socket mounted on the device.

In other environments a dock or socket based charging system, utilizing exposed electrical contacts, is employed. When a docking station is used, the device can be charged relatively quickly by placing the device directly on the contacts of the charging portion of the docking station. In a clinical environment exposed charging contacts are usually desirable because the contacts can then be easily accessed for cleaning. However, the potential danger of exposed contacts in a clinical environment is substantial and thus there are many safety requirements that must be satisfied regarding patient isolation as well as the magnitude of any exposed voltages. In response to these regulatory and safety concerns, charging systems sometimes utilize a second set of contacts to detect that a device is properly docked before supplying the battery charging voltage. However, two sets of contacts are inherently undesirable because it increases the expense and opportunity for failure and there may not be enough room for them. In addition, some method is desired to confirm that a portable instrument is properly docked within the station and to permit the efficient transfer of electrical power to the portable instrument without regard to the supply voltage polarity. An electronic device identification system constructed according to the principles of the present invention addresses these deficiencies and related problems.

BRIEF SUMMARY OF THE INVENTION

In accordance with principles of the present invention, an electronic device identification system includes a rectifier bridge for providing an output DC voltage of fixed polarity from an input DC voltage of a corresponding or reverse polarity. The system further includes an identification component coupled across an input to the rectifier bridge. This enables identification of the identification component value via electrical detection circuitry applied to the input to the rectifier bridge.

DETAILED DESCRIPTION OF THE INVENTION

The term "characteristic of a component", as used in this application, means an electrically or electronically detectable characteristic of an electrical or electronic component. For example, for a passive electronic component, such as a resistor, capacitor, or inductor, a detectable characteristic may be the resistance, capacitance or inductance, respectively. For an active electronic component, a detectable characteristic may be: (a) a signal, (b) a message and/or (c) a value generated by the component when activated.

Figure 1:
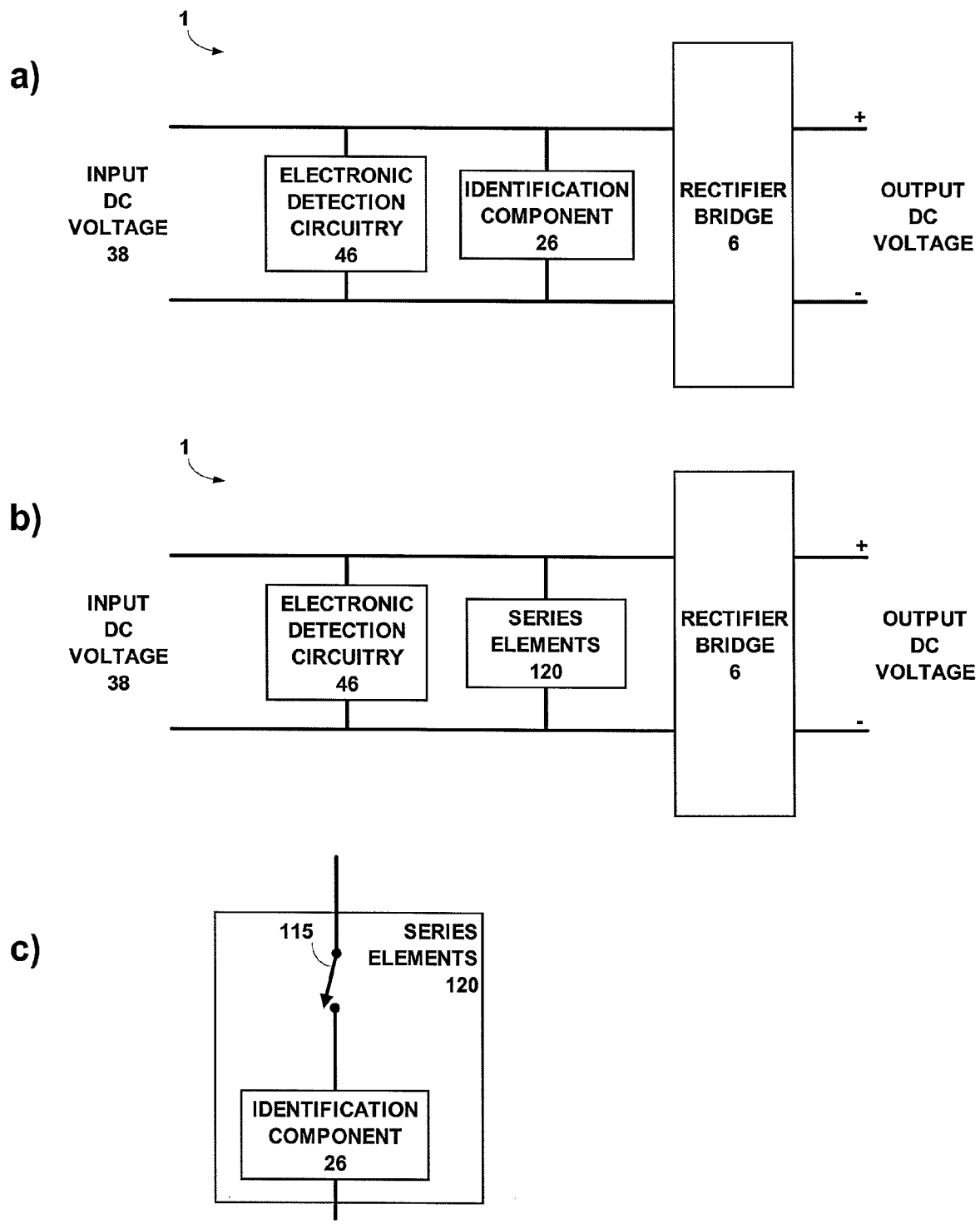
FIG. 1 is a block diagram of an electronic device identification system according to principles of the present invention.

FIG. 1 is a block diagram of an electronic device identification system 1 according to principles of the present invention. In FIG. 1a, a rectifier bridge 6 provides an output DC voltage of fixed polarity from an input DC voltage of a corresponding or reverse polarity. An identification component 26 is coupled across an input to the rectifier bridge 6. This enables identification of the identification component value via electrical detection circuitry 46 applied to the rectifier bridge. The rectifier bridge 6 is substantially switched off preventing provision of the output DC voltage when the identification component 26 is not identified by the detection circuitry 46. The rectifier bridge 6 is substantially switched on and providing the output DC voltage when the identification component is identified by the detection circuitry 46.

The identification component 26 may be a passive identification component and may be: (a) a resistor, (b) a capacitor and/or (c) an inductor. Alternatively, the identification component 26 may be an active identification component providing: (a) a signal, (b) a message and/or (c) a value, when activated. The rectifier bridge 6 may employ semiconductor switching devices. Such semiconductor switching devices may be: (a) MOSFETs, (b) transistors and/or (c) diodes.

FIG. 1b illustrates another embodiment of an electronic device identification system according to principles of the present invention. Those elements which are the same as those illustrated in FIG. 1a are designated by the same reference number and are not described in detail. In FIG. 1b, series elements 120 are coupled across the input to the rectifier bridge 6. Referring concurrently to FIG. 1c, the series elements 120 include the identification component 26 in series with at least one switch device 115. The at least one switch device 115, in a first mode, electrically couples the identification component 26 across the input to the rectifier bridge 6. This enables identification of the identification component value via the electrical detection circuitry 46 applied to the input to the rectifier bridge 6. The rectifier bridge 6 is substantially switched off, preventing provision of the output DC voltage, during the first mode, and the rectifier bridge 6 is substantially switched on, providing the output DC voltage, during the second mode.

As described above, the identification component 26 may be a passive identification component and may be: (a) a resistor, (b) a capacitor and/or (c) an inductor. Alternatively, the identification component 26 may be an active identification component providing: (a) a signal, (b) a message and/or (c) a value, when activated. The at least one switch device 115 may be: (a) a semiconductor device, and/or (b) a relay. The rectifier bridge 6 may employ semiconductor switching devices. Such semiconductor switching devices may be: (a) MOSFETs, (b) transistors and/or (c) diodes.

Figure 2:
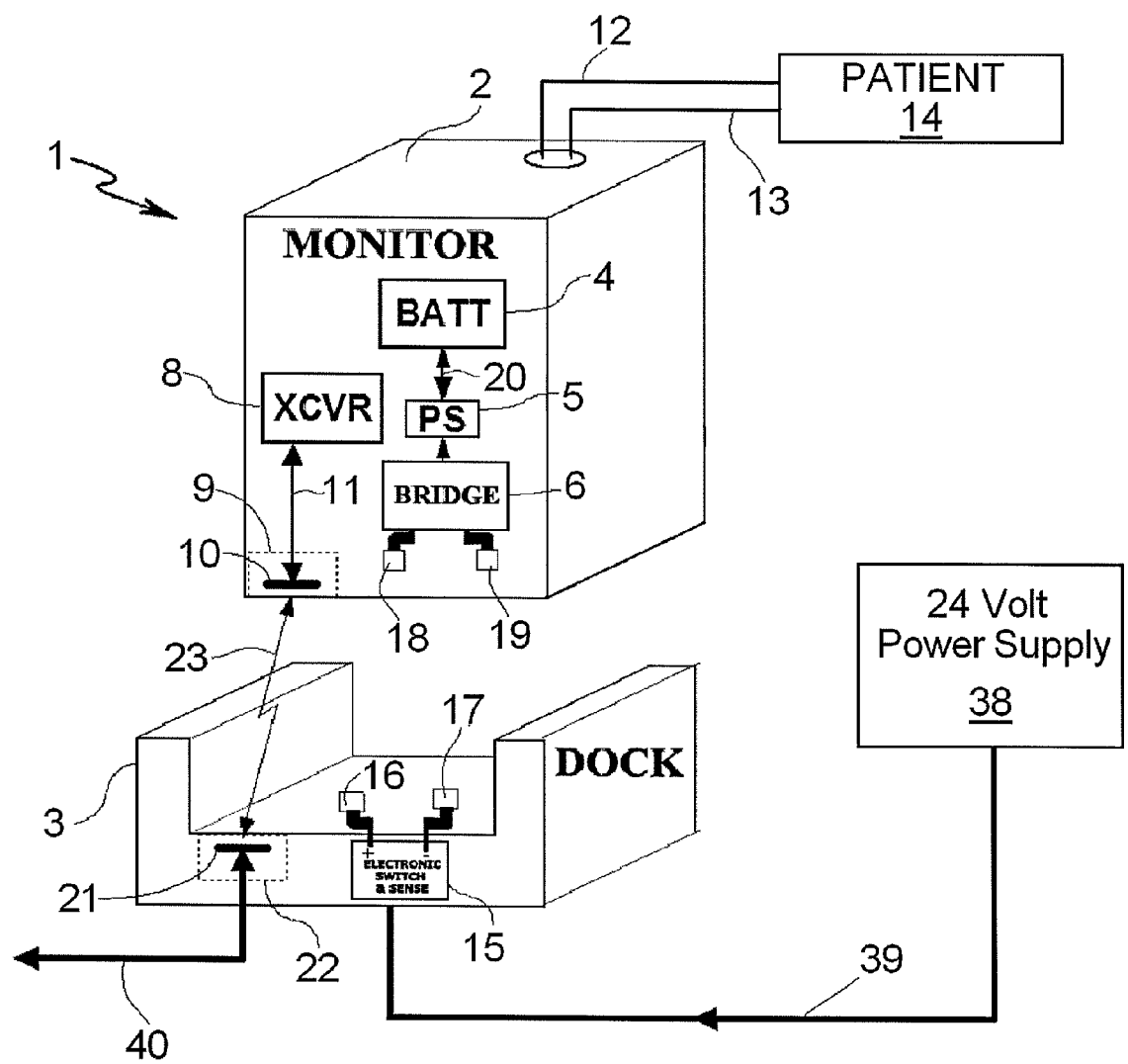
FIG. 2 is a block diagram of a system including a portable medical device and a docking station incorporating principles of the present invention.

FIG. 2 illustrates a more detailed embodiment of a system 1 according to the principles of the present invention. The system 1 includes a portable battery operated patient monitor or other portable electronic device 2. The patient monitor 2 typically includes isolated sensor leads 12 and 13, for example, which are interconnected to a patient 14. The system 1 includes a dock 3 which is adapted to receive the patient monitor 2. A twenty four volt power supply 38 supplies power to the dock 3 via path 39. When the patient monitor 2 is not attached to the dock 3, the internal power supply 5 supplies current from the battery 4 to the patient monitor 2. When the patient monitor 2 is attached to the dock 3, the power supply 5 receives current from the twenty four volt power supply 38 and performs two functions, namely supplying current to the monitor 2 while simultaneously supplying current to recharge the battery 4.

The patient monitor 2 also includes a data transceiver 8 which is interfaced via path 11 to an infrared (IR) transceiver diode assembly 9 which is formed to include a hermetically sealed IR window 10. The dock 3 also includes a hermetically sealed IR window 21 that is contained within an IR transceiver diode assembly 22. The IR transceiver diode assemblies 9 and 22 permit data intercommunication between the dock 3 and the portable device 2 via infrared link 23. The link 23 permits the data transceiver 8 to communicate with a local area network (LAN) 40.

The portable device 2 includes battery charging contacts 18 and 19. The dock 3 has two mating contacts 16 and 17, and the dock is adapted to receive the monitor 2 in either of two positions, each offset from the other by approximately one hundred eighty degrees, so that the contact 18 may, in a first position interconnect with contact 16, while in a second position contact 18 interconnects with contact 17. The dock 3 includes an electronic switch and sensor 15 that controls the application of power to the power pins 16 and 17. The power supply 5 is interconnected to a bridge circuit 6 which transfers power from contacts 18 and 19 to the power supply 5.

Figure 3:
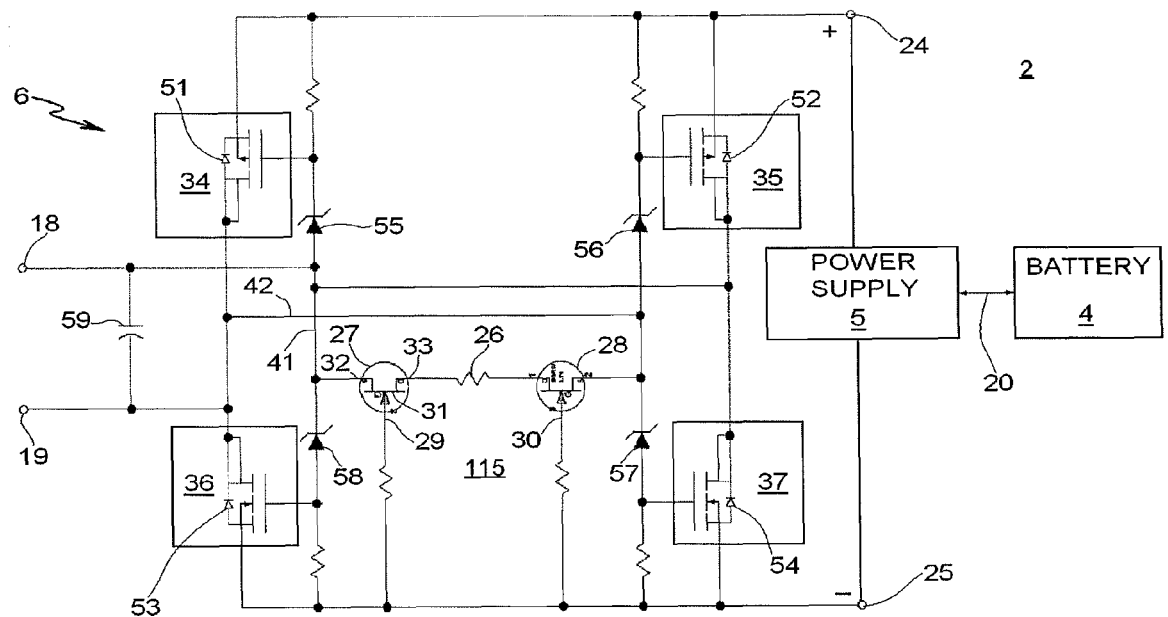
FIG. 3 is a schematic diagram of a portion of a portable medical device implementing the electronic device identification system according to principles of the present invention.

Referring to FIG. 3, the operation of the bridge circuit 6 may be better understood. In the illustrated embodiment, the bridge circuit 6 is designed for twenty four volt operation. One skilled in the art understands that power supplies operating at other voltages may also be used. While the power supply 5 is shown as the output load for the bridge circuit 6, any of a wide variety of loads may be placed across the positive output terminal 24 and the negative output terminal 25. The electronic switch and sensor 15 (FIG. 2), in one embodiment, provides a stimulus of either polarity that is applied to the input terminals 18 and 19, but any of a wide variety of other sources of power may be used as the input source to the bridge circuit 6.

In the illustrated embodiment, the bridge circuit 6 includes a passive identification component such as resistor 26 which, in one embodiment, has a value of approximately two thousand ohms. One skilled in the art understands that an active identification component, which may send a signal, message or value representing the identification of the active identification component when energized, may be used instead of a passive identification component. One skilled in the art further understands that identification of such a signal, message or value requires different detectors, understands how to design and implement such detectors, and understands how to interconnect them with the remainder of the circuitry of the present invention.

The resistor 26 is coupled in series with a first N-channel depletion mode field effect transistor (FET) 27 and a second N-channel depletion mode FET 28. The combination of FETs 27 and 28 form the switch device 115 (of FIG. 1). In an N-channel depletion-mode device such as FET 27 and 28, a negative voltage at gate electrode 29 or 30 (with respect to the source electrode 32) causes the depletion region to expand in size and encroach on the channel from the side, narrowing the channel or path 31 that links the source 32 to the drain 33. When the depletion region completely closes the channel due to the magnitude of the negative voltage applied at gate 29, the resistance of the channel 31 becomes very large, and the source-drain conduction path of the FET 27 is effectively turned off, that is, current is unable to flow between the source 32 and the drain 33. In contrast, a positive voltage at gate electrode 29 or 30 (with respect to the source electrodes) attracts electrons from the surrounding semiconductor material that resides in the region adjacent to the gate, thereby forming a relatively low resistance conductive channel 31. FETs 27 and 28, thus, operate as voltage responsive variable resistance elements. When a relatively low voltage is applied to the input terminals 18 and 19, the source-gate voltages of FET 27 and FET 28 are nearly zero and the source-drain conductive path is in the conductive state. In this state, the resistor 26 is connected across the input terminals 18 and 19 through FETs 27 and 28.

An input capacitor 59, having a value of approximately 0.01 microfarad, is also connected across terminals 18 and 19 to provide voltage filtering between the power source 38 and the rectifier bridge 6. Upon removal of he portable device 2 from the dock 3 (FIG. 2), and in the absence of any other circuitry, the voltage across the capacitor 59 may remain at the voltage it was at before removal. Because the terminals 18 and 19 are exposed, this presents a shock hazard to persons handling the portable device 2. The series elements, which in FIG. 3 are FET 27, FET 28 and resistor 26, discharge the capacitor 59 coupled across an input to the rectifier bridge 6 and coupled to exposed terminals 18 and 19 connected to the input. This prevents an electric shock hazard from the exposed terminals 18 and 19 caused by inadvertent contact with the terminals when the portable device 2 is removed from the dock 3.

In operation, a relatively low voltage is generated within a docking station 3. The relatively low voltage is supplied to the electronic instrument 2. As described above, the identification component 26 is coupled across the input terminals 18 and 19 by the switch device 115 in this condition. A characteristic of the component 26 (e.g. its resistance) within the electronic instrument 2 is detected. A relatively high voltage is supplied to the electronic instrument 2 in response to detection of the component 26. An actual polarity of the relatively high voltage is determined and a required polarity of the electrical load, e.g. power supply 5, is determined. The actual polarity of the relatively high voltage is converted to the required polarity of the electrical load, e.g. power supply 5, as necessary, to properly supply the relatively high voltage to the electrical load, e.g. power supply 5. The FETs 34, 35, 36 and 37 operate as a bridge to supply a positive output DC voltage at the output terminal 24 and a negative output DC voltage at the output terminal 25 regardless of the polarity of the input DC voltage at input terminals 18 and 19, as will be described in more detail below.

The component 26 within electronic instrument 2 is electrically isolated as soon as the relatively high voltage is supplied to the electronic instrument 2. More specifically, the component 26 is located between voltage responsive variable resistance elements (e.g. FETs 27, 28) and the component 26 is isolated by varying the voltage supplied to the voltage responsive variable resistance elements FETs 27, 28. This prevents dissipation of power through the resistor 26 during operation of the rectifier bridge 6 while powered by the twenty-four volt power supply 38 (FIG. 2).

One skilled in the art recognizes that it is not necessary to isolate the identification component 26 when it has been identified by the electrical detection circuitry 46. Consequently, the switch device 115 (i.e. FETs 27 and 28) is not a required element in a system according to principles of the present invention. Instead it provides an additional advantage of stopping power dissipation of the identification component 26 after it has been identified by the electronic detection circuitry 46.

The electronic instrument 2 is formed to include first and second electrical terminals, e.g. 18, 19. The relatively high voltage and the relatively low voltage are supplied to the electronic instrument 2 through the first and second electrical terminals, e.g. 18,19. The characteristic of the component 26 within the electronic instrument 2 is detected through the first and second electrical terminals, e.g. 18, 19.

Figure 4:
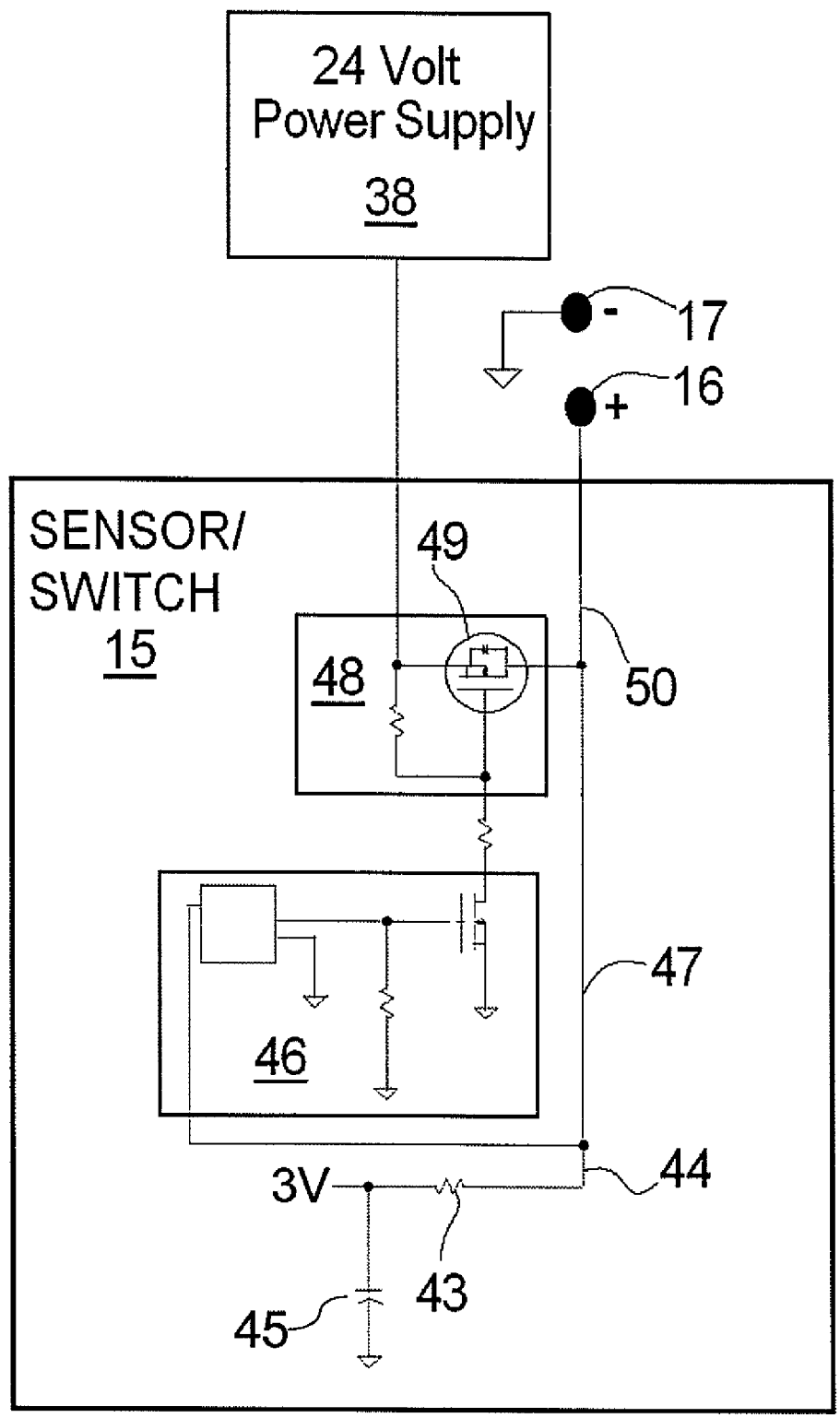
FIG. 4 is a diagram, partially in block form and partially in schematic form of a portion of a docking station implementing the electronic device identification system according to principles of the present invention.

Referring to FIG. 4, the operation of the electronic switch 15 that resides in the dock 3 may be understood. The electronic switch 15 operates so that at the moments before and as the monitor 2 is being docked, the positive polarity pad 16 of the dock 3 is exposed via the circuit path 44 to a potential of approximately three volts. This voltage is provided by a voltage source (not shown) which is applied to a capacitor 45 and resistor 43. The resistor 43 has a value of approximately ten thousand ohms. The three volt value of voltage across the terminals 16 and 17 produces a patient safe mode for the exposed supply terminals 16 and 17.

In the absence of the monitor 2 at terminals 16 and 17, the resistor 26 within monitor 2 (FIG. 3) cannot be detected by the electronic switch 15 and no current flows across terminals 16 and 17. The patient safe mode, thus, is maintained. However, when the monitor 2 is present in dock 3, the resistor 26 in the monitor 2 is coupled across the terminals 16 and 17 passing a current across terminals 16 and 17. The electronic switch 15 is able to detect the presence of the resistor 26 by the presence of the current across terminals 16 and 17. The resistors 43 and 26 form a voltage divider. In particular, the current flowing through resistor 43 along circuit path 47 and through the resistor 26 within the monitor 2, produces a potential difference of approximately one-half volt across the dock terminals 16 and 17. The passive resistance monitor sensor 46 detects the presence of approximately one-half volt, and in response conditions the main power switch 48 to supply twenty-four volts from the power supply 38 (FIG. 2) to the circuit path 50 via the field effect transistor 49. In response to the higher twenty-four volt potential, the FETs 27 and 28 (FIG. 3) in the monitor 2 become nonconductive and the resistor 26 is isolated, in a manner described in more detail below.

In operation, referring to FIG. 3, once the monitor 2 is placed in dock 3 (FIG. 4), the relatively low, approximately one-half volt, potential occurs across the bridge circuit 6, as described above. When voltages of less than 1.20 volts, which is the equivalent of the voltage drop caused by two series connected diodes, are applied to the bridge circuit 6 via the terminals 18 and 19, the four FETs 34, 35, 36 and 37 which form the rectifier bridge 6 are biased off and their internal parasitic diodes 51, 52, 53 and 54 do not conduct. However, FETs 27 and 28, which are N Channel depletion mode devices, do conduct in response to a relatively small source-gate voltage. Thus, resistor 26, which is coupled in series with FET 27 and 28 across the input terminals 18, 19 of the bridge 6, is not isolated and its presence may be sensed by the sensor switch 15 (FIG. 4) when voltage below 1.20 volts is applied. Thus, a relatively low voltage, low current excitation is applied to exposed terminals 16 and 17 to sense the presence of and verify when an appropriate load circuit such as power supply 5 is present.

Once the presence of the resistor 26, and thus the power supply 5 within the monitor 2 is detected and verified, a voltage source such as the twenty four volt power supply 38 (FIG. 2) may be connected to the dock 3 via the main power switch 48 (FIG. 4). This represents the relatively high voltage. The relatively high voltage may be energized in either polarity. Assume, for example, that the input voltage is increased to twenty four volts with terminal 18 being the positive terminal and terminal 19 being the negative terminal. As the input voltage rises to a value that is greater than 1.20 volts, the parasitic diodes 52 and 53 in FETs 35 and 36, respectively, begin to conduct and supply a voltage signal to the power supply 5, with the original voltage polarity and magnitude minus the two diode voltage drop values. As the input voltage increases to approximately 14.20 volts, the nominally twelve volt Zener diodes 58 and 56 begin to conduct. As the voltage increases above 14.20 volts, FETs 35 and 36 begin to conduct. As the voltage increases to twenty four volts, FETs 35 and 36 have been fully enhanced, thereby achieving full voltage transfer from input terminals 18 and 19 to output terminals 24 and 25 with a voltage drop that is dependent on the internal resistance of each FET and the magnitude of the load current, which is typically just a few hundreds of milliamperes. For an applied voltage of the opposite polarity, FETs 34 and 37 in conjunction with Zener diodes 55 and 57 perform the same voltage transfer function.

At relatively higher input voltages, FETs 27 and 28 act to isolate resistor 26, thereby preventing unnecessary power dissipation through it. When terminal 18 is positive and terminal 19 is negative, FET 27 becomes nonconductive because its source voltage (approximately 12 volts, as controlled by the Zener diode 58) exceeds its gate voltage (approximately zero volts). The source-drain conductive path of the FET 27 becomes nonconductive, isolating the resistor 26 from the input terminals 18, 19. For the opposite input polarity, FET 28 provides similar functionality.

Referring to FIG. 1, the system 1 performs the following activities: generating a relatively low voltage within a docking station 3; supplying the relatively low voltage to the electronic instrument 2; detecting a characteristic of a component 26 within the electronic instrument 2; and supplying a relatively high voltage to the electronic instrument 2 in response to detection of the characteristic of the component.

In one embodiment, the system 1 further performs the activity of electrically isolating the identification component 26 within the electronic instrument 2 as soon as the relatively high voltage is applied to the electronic instrument 2. In addition, the system further performs the following activities: locating the identification component 26 in series with a voltage responsive variable resistance element 27, 28 (FIG. 3); and isolating the identification component by varying a voltage supplied to the voltage responsive variable resistance element 27, 28. As described above, this stops dissipation of energy by the identification component 26.

The system 1 performs the following activities: determining an actual polarity of the relatively high voltage; determining a required polarity of the electrical load 5 (FIG. 3); and converting the actual polarity of the relatively high voltage to the required polarity of the electrical load 5 as necessary to properly supply the relatively high voltage to the electrical load 5. In addition, the system 1 performs the following activities: forming the electronic instrument 1 to include first and second electrical terminals 18 and 19, respectively; supplying the relatively high voltage and the relatively low voltage to the electronic instrument 1 through the first and second electrical terminals 18 and 19, respectively; and detecting the characteristic of the identification component 26 within the electronic instrument 1 through the first and second electrical terminals 18 and 19, respectively.

While the invention has been described with reference to a specific embodiment, various modifications may be made. One skilled in the art understands that the series elements 120 and the rectifier bridge 6 may be incorporated in a portable medical device attached to a patient 14, as described above. Further, resistor 26 may be replaced by other passive components such as an inductor or a capacitor. The components utilized to perform the function of electronic sensor and switch 15 may include semiconductors, relays or a combination of both. Further, the semiconductor devices used within switch 15 may be either conventional transistors or metal oxide silicon field effect transistors (MOSFETs). While a passive identification component in the form of resistor 26 has been disclosed in one embodiment, an active component or circuit may be utilized which may generate an identification signal, message or value that is indicative of the status of docking and polarity. The scope of the invention is defined entirely by the appended claims.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

What is claimed is:

1. An electronic device identification system, comprising:
   a rectifier bridge for providing an output DC voltage of fixed polarity from an input DC voltage of a corresponding or reverse polarity;
   an identification component coupled across an input to said rectifier bridge, enabling identification of said identification component value via electrical detection circuitry applied to said input to said rectifier bridge; and
   a capacitor coupled across said input to said rectifier bridge and coupled to exposed terminals connected to said input to said rectifier bridge, said identification component discharging said capacitor to prevent electric shock hazard from said exposed terminals, wherein the capacitor is discharged when the input DC voltage is removed.

2. A system according to claim 1 wherein:
   said rectifier bridge is substantially switched off preventing provision of said output DC voltage when said identification component is not identified by the detection circuitry; and
   said rectifier bridge is substantially switched on and providing said output DC voltage when said identification component is identified by the detection circuitry.

3. A system according to claim 1 wherein said identification component comprises a passive identification component being at least one of: (a) a resistor, (b) a capacitor and (c) an inductor.

4. A system according to claim 1 wherein said identification component comprises an active identification component providing at least one of: (a) a signal, (b) a message, and (c) a value, when activated.

5. A system according to claim 1 wherein said rectifier bridge employs semiconductor switching devices.

6. A system according to claim 5 wherein said semiconductor switching devices comprise at least one of: (a) MOSFETs, (b) transistors, and (c) diodes.

7. A system according to claim 1 wherein said identification component and said rectifier bridge are incorporated in a portable medical device attached to a patient.

8. An electronic device identification system, comprising:
   a rectifier bridge for providing an output DC voltage of fixed polarity from an input DC voltage of a corresponding or reverse polarity;
   series elements comprising an identification component in series with at least one switch device and coupled across an input to said rectifier bridge, said at least one switch device, in a first mode, electrically coupling said identification component across said input to said rectifier bridge enabling identification of said identification component value via electrical detection circuitry applied to said input to said rectifier bridge, said at least one switch device, in a second mode, substantially electrically isolating said identification component from said input to said rectifier bridge; and
   a capacitor coupled across said input to said rectifier bridge and coupled to exposed terminals connected to said input to said series elements, said identification component discharging said capacitor to prevent electric shock hazard from said exposed terminals, wherein the capacitor is discharged when the input DC voltage is removed.

9. A system according to claim 8 wherein:
   said rectifier bridge is substantially switched off preventing provision of said output DC voltage during said first mode; and
   said rectifier bridge is substantially switched on and providing said output DC voltage during said second mode.

10. A system according to claim 9 wherein said identification component comprises a passive identification component being at least one of: (a) a resistor, (b) a capacitor and (c) an inductor.

11. A system according to claim 9 wherein said identification component comprises an active identification component providing at least one of: (a) a signal, (b) a message, and (c) a value, when activated.

12. A system according to claim 9 wherein said at least one switch device is at least one of: (a) a semiconductor device and (b) a relay.

13. A system according to claim 9 wherein said rectifier bridge employs semiconductor switching devices.

14. A system according to claim 13 wherein said semiconductor switching devices comprise at least one of: (a) MOSFETs, (b) transistors, and (c) diodes.

15. A system according to claim 9 wherein said series elements and said rectifier bridge are incorporated in a portable medical device attached to a patient.

16. A method for operating an electronic device identification system, comprising the steps of:
   generating a relatively low voltage within a docking station;

supplying the relatively low voltage to first and second electrical terminals of the electronic instrument;

detecting a characteristic of an identification component within the electronic instrument through the first and second electrical terminals;

supplying a relatively high voltage to the first and second terminals of the electronic instrument in response to detection of the characteristic of the identification component;

determining an actual polarity of the relatively high voltage;

determining a required polarity of the electronic instrument; and converting the actual polarity of the relatively high voltage to the required polarity of the electronic instrument as necessary to properly supply the relatively high voltage to the electronic instrument; and discharging a capacitor connected to the input of the electronic instrument through the identification component when the relatively high voltage is removed.

17. The method of claim 16, further comprising the step of electrically isolating the component within the electronic instrument as soon as the relatively high voltage is applied to the electronic instrument.

18. The method of claim 17, further comprising the steps of:
    locating the identification component in series with a voltage responsive variable resistance element; and
    isolating the identification component by varying a voltage supplied to the voltage responsive variable resistance element.

19. The system of claim 1, further comprising first and second variable resistance elements, coupled to said identification component, that electrically isolates said identification component when a relatively high voltage is supplied to the variable resistance elements.

20. The system of claim 8, further comprising first and second variable resistance elements, coupled to said identification component, that electrically isolates said identification component when a relatively high voltage is supplied to the variable resistance elements.

21. An identification component comprising:
    a docking station comprising:
        a power supply that generates a relatively low voltage and a relatively high voltage;
        first and second electrical terminals; and
        an electronic switch;
    an electronic device including:
        a rectifier bridge for providing an output DC voltage of fixed polarity from the voltage generated by the power supply when the electronic device is received by the docking station;
        an identification component coupled across an input to said rectifier bridge, enabling identification of said identification component value via electrical detection circuitry applied to said input to said rectifier bridge; and
        a capacitor coupled across said input to said rectifier bridge and coupled to exposed terminals connected to said input to said rectifier bridge, said identification component discharging said capacitor to prevent electric shock hazard from said exposed terminals when the voltage generated by the power supply is removed;
    wherein, the electronic switch in a first operating mode, supplies the relatively low voltage through the first and second electrical terminals to the rectifier bridge; and, in a second operating mode, upon detection of a characteristic of an identification component within the electronic instrument, supplies the relatively high voltage through the first and second terminals to the rectifier bridge.

22. An electronic device, comprising:
    first and second electrical terminals for connection to a docking station;
    an identification component coupled to the first and second electrical terminals, wherein the first and second electrical terminals initially receive a relatively low voltage from the docking station and, upon detection of a characteristic of the identification component by the docking station, receive a relatively high voltage from the docking station,
    a rectifier bridge coupled to the first and second electrical terminals for providing an output DC voltage of fixed polarity from the voltage received from the docking station; and
    a capacitor coupled across an input to said rectifier bridge and coupled to the first and second electrical terminals, said identification component discharging said capacitor to prevent electric shock hazard from said exposed terminals, wherein the capacitor is discharged when the voltage received from the docking station is removed.

23. The system of claim 22, wherein the identification component is electrically isolated as soon as the relatively high voltage is applied through the first and second electrical terminals.

24. The system of claim 22, wherein said identification component comprises a passive identification component being at least one of: (a) a resistor, (b) a capacitor and (c) an inductor.

25. The system of claim 22, wherein said identification component comprises an active identification component providing at least one of: (a) a signal, (b) a message, and (b) a value, when activated.

* * * * *